United States Patent
Kitano et al.

[19]

[11] Patent Number: 6,056,656
[45] Date of Patent: May 2, 2000

[54] V-RIBBED BELT

[75] Inventors: Yoshiyuki Kitano; Masaaki Ogino, both of Kobe, Japan

[73] Assignee: Bando Chemical Industries, Ltd., Kobe, Japan

[21] Appl. No.: 09/033,849

[22] Filed: Mar. 3, 1998

[30]   Foreign Application Priority Data

Mar. 4, 1997  [JP]  Japan .................................. 9-049051

[51] Int. Cl.$^7$ ........................................................ F16G 1/04
[52] U.S. Cl. ........................ 474/268; 474/205; 474/266; 474/260
[58] Field of Search ................................. 474/205, 263, 474/264, 265, 268, 202, 204, 266, 260, 271, 237, 238; 428/295.1, 337, 252; 156/137–140; 524/100

[56]          References Cited

U.S. PATENT DOCUMENTS

| | | | |
|---|---|---|---|
| 3,667,308 | 6/1972 | Schwab et al. ................. | 474/265 X |
| 4,127,039 | 11/1978 | Hollaway, Jr. .................. | 474/265 X |
| 4,721,496 | 1/1988 | Yokoyama et al. ............... | 474/205 |
| 4,762,745 | 8/1988 | Mashimo et al. ................. | 428/252 |
| 5,178,586 | 1/1993 | Mizuno et al. .................. | 474/266 |
| 5,387,160 | 2/1995 | Nakajima et al. ................ | 474/205 |
| 5,531,649 | 7/1996 | Osaka et al. .................... | 474/204 |
| 5,610,217 | 3/1997 | Yarnell et al. ................... | 524/397 |
| 5,714,024 | 2/1998 | Tomiyama et al. ............... | 156/137 |
| 5,723,523 | 3/1998 | Engelhardt et al. ............... | 524/100 |
| 5,779,584 | 7/1998 | Noguchi ......................... | 474/237 X |
| 5,891,561 | 4/1999 | Kinoshita et al. ................ | 474/266 X |

OTHER PUBLICATIONS

Patent Abstracts of Japan, Publication No. 06–323368 A, Nov. 25, 1994, "V–Ribbed Belt", Tajima Yoshitaka et al.

*Primary Examiner*—David A. Bucci
*Assistant Examiner*—Marcus Charles
*Attorney, Agent, or Firm*—Nixon Peabody LLP; Thomas W. Cole

[57]          ABSTRACT

A V-ribbed belt A is made up of a compression rubber 3, an adhesion rubber 1 laminated to the upper surface of the compression rubber 3, and a plurality of tension members 2 fixed by rubber of the adhesion rubber 1 to be held in place in the adhesion rubber 1 and arranged in the direction of the length of the belt. The upper surface of the adhesion rubber 1 is covered with a covering fabric-rubber composite B. All the rubber sections of the composite B are composed of a rubber compound formed by incorporating 5 to 15 phr of an adhesive prepared by mixing resorcinol or denatured resorcinol with a methylene donor, into H-NBR. The adhesion rubber 1 and the compression rubber 3 are composed of a rubber compound whose principal components are ACSM and carbon for achieving good belt back-face drive in high-temperature environment.

5 Claims, 4 Drawing Sheets

V-RIBBED BELT

BACKGROUND OF THE INVENTION

This invention relates to a V-ribbed belt used to drive auxiliary automotive machinery, such as a generator, a cooling fan and an oil pump, by motion transmitted from the back of the V-ribbed belt (hereinafter called "belt back-face drive").

V-ribbed belts are characterized such that they combine the advantage of flat belts (flexibility) and the advantage of V-shaped belts (high motion transmission capacity) and have therefore application in the area of driving belts suitable for the operation of automobile auxiliary machinery. A typical V-ribbed belt is made up of a compression rubber layer, an adhesion rubber layer laminated to the upper surface of the compression rubber layer, and tension members fixed in the adhesion rubber layer so as to be held in place by rubber of the adhesion rubber layer and arranged in the direction of the length of the belt. A plurality of grooves with a cross section of vee shape are formed continuously in the lower surface of the compression rubber layer in the belt length direction. A composite of a covering fabric and rubber is coated over the upper surface of the adhesion rubber layer.

In early practice, V-ribbed belts were used such that they were passed, in open-drive manner, around two pulleys, namely a crank pulley and an auxiliary machinery pulley. In recent years, however, the manner in which V-ribbed belts are used has changed. For instance, a flat pulley is employed on the back of a belt to obtain an increase in the angle of contact of the belt with respect to an auxiliary machinery pulley in order that the auxiliary machine pulley may be given sufficient driving force. Further, in view of the layout of engine parts, a flat pulley is mounted to prevent the belt from coming into contact with an engine part.

Japanese Laid-Open Patent Application Publication No. 6-323368 shows a covering fabric-rubber composite. This prior art fabric-rubber composite is made up of a covering fabric, an impregnated rubber introduced into the covering fabric, an upper rubber layer applied onto the upper surface of the covering fabric, a lower rubber layer applied onto the lower surface of the covering fabric, and an adhesive rubber layer applied onto the lower surface of the lower rubber layer and used to provide adhesion of the covering fabric-rubber composite to the upper surface of the adhesion rubber layer. At least the upper rubber layer is composed of a rubber compound superior in abrasion resistance and in conductivity, with a view to achieving both a reduction of the belt back-face abrading and a reduction of the belt back-face viscosity, in other words with a view to providing improvement in abrasion/viscosity resistance.

With luxurization of general automobiles, V-ribbed belt back-face drive is more extensively adopted. In order to achieve a compact engine room, reducing the dimensions of pulleys, together with saving space, is making progress. This, however, results in a considerable rise in engin room atomspheric temperature. The above-described prior art V-ribbed belt may find it difficult to perform belt back-face drive because of being poor in heat crack resistance. Accordingly, there is still room for improvement.

SUMMARY OF THE INVENTION

Bearing in mind the above-noted problem with the prior art technique, the present invention was made. Accordingly, an object of the present invention is to provide an improved covering fabric-rubber composite for use in V-ribbed belts for the achievement of good V-ribbed belt back-face drive, even in situations where temperature is high.

Of all sections, that are composed of rubber, of a covering fabric-rubber composite prepared in accordance with the present invention, at least an upper rubber layer is composed of a rubber compound having both an abrasion/viscosity resistance and a heat crack resistance.

The present invention provides a first V-ribbed belt comprising (a) a compression rubber, (b) an adhesion rubber laminated to the upper surface of said compression rubber, and (c) a tension member fixed by rubber of said adhesion rubber to be held in place in said adhesion rubber and arranged in the direction of the length of said V-ribbed belt wherein a plurality of grooves with a cross-section of vee shape are formed in the lower surface of said compression rubber, continuously extending in the direction of the length of said V-ribbed belt and wherein the upper surface of said adhesion rubber is covered with a covering fabric-rubber composite;

said covering fabric-rubber composite including:
   a covering fabric;
   an impregnated rubber introduced into said covering fabric;
   an upper rubber layer applied onto the upper surface of said covering fabric;
   a lower rubber layer applied onto the lower surface of said covering fabric; and
   an adhesive rubber layer applied onto the lower surface of said lower rubber layer and providing adhesion of said covering fabric-rubber composite to the upper surface of said adhesion rubber;
wherein at least said upper rubber layer of said rubber sections of said covering fabric-rubber composite is composed of a rubber compound that has resistance to abrasion/viscosity and resistance to heat cracking.

The advantage of forming the upper rubber layer from an abrasion/viscosity and heat crack resistant rubber compound is explained. Even when belt back-face drive of a V-ribbed belt to is carried out at high temperature, it is possible to achieve both a reduction in abrasion and a reduction in viscosity at the belt back side. Additionally, cracking is made unlikely to occur. This ensures that satisfactory belt back-face drive can be carried out even at a high temperature.

It is preferred that the rubber compound is a compound formed by incorporating 5 to 15 phr of an adhesive prepared by mixing resorcinol or denatured resorcinol with a methylene donor, into H-NBR (hydrogenated acrylonitrile-butadiene rubber).

The H-NBR exhibits excellent heat resistance. An adequate dose of H-NBR to the foregoing adhesive allows rubber compounds to have good processibility while allowing the upper rubber layer to exhibit improved abrasion/viscosity resistance and heat crack resistance. If the H-NBR dose falls below 5 phr, this results in insufficient improvements in adhesion, in abrasion/viscosity resistance, and in heat crack resistance. On the other hand, if the H-NBR dose exceeds 15 phr, this results in the occurrence of scorching at the time of rubber processing because the adhesive is a reactive phenolic resin. Poor processibility results and there occurs a reduction of the heat crack resistance.

It is preferred that each of the impregnated rubber layer, the upper rubber layer, the lower rubber layer, and the adhesive rubber layer of the covering fabric-rubber composite is composed of a rubber compound formed by incorporating 5 to 15 phr of an adhesive prepared by mixing resorcinol or denatured resorcinol with a methylene donor, into H-NBR, and that each of the adhesion rubber and the compression rubber is composed of a rubber compound whose principal components are rubber other than H-NBR and carbon.

Such arrangement improves the adhesion of the covering fabric-rubber composite to the adhesion rubber layer. Additionally, even when the adhesion rubber layer is composed of rubber other than H-NBR, the adhesion of the covering fabric-rubber composite to the adhesion rubber layer can be enhanced. This makes it possible to hold the amount of H-NBR to be used low, which is an advantage because the H-NBR is expensive. Additionally, each of the adhesion rubber layer and the compression rubber may be prepared with an adequate rubber composition to meet performance required. To sum up, while achieving a reduction of the production cost, optimum rubber compounds for the preparation of the adhesion rubber and the compression rubber may be employed.

The rubber other than H-NBR is preferably alkylated chlorosulfonated polyethylene (hereinafter called ACSM). This enables the adhesion rubber layer and the compression rubber to exhibit, for example, improved heat resistance and improved dynamic fatigue resistance. An improved V-ribbed belt can be provided which is most suitable for belt motion transmission including belt back-face drive in a high temperature environment while achieving a reduction of the costs.

The present invention provides a second V-ribbed belt comprising (a) a compression rubber, (b) an adhesion rubber laminated to the upper surface of said compression rubber, and (c) a tension member fixed by rubber of said adhesion rubber to be held in place in said adhesion rubber and arranged in the direction of the length of said V-ribbed belt wherein a plurality of grooves with a cross-section of vee shape are formed in the lower surface of said compression rubber, continuously extending in the direction of the length of said V-ribbed belt and wherein the upper surface of said adhesion rubber is covered with a covering fabric-rubber composite;

said covering fabric-rubber composite including:
a covering fabric impregnated with resorcinol-formalin latex;
an impregnated rubber introduced into said covering fabric;
an upper rubber layer applied onto the upper surface of said covering fabric;
a lower rubber layer applied onto the lower surface of said covering fabric; and
an adhesive rubber applied onto the lower surface of said lower rubber layer and providing adhesion of said covering fabric-rubber composite to the upper surface of said adhesion rubber;
wherein at least said upper rubber layer of said rubber sections of said covering fabric-rubber composite is formed of a rubber compound whose principal components are H-NBR and carbon.

The second V-ribbed belt differs from the first V-ribbed belt in that (a) the covering fabric is RFL-treated and (b) at least the upper rubber layer is formed of a rubber compound whose principal components are H-NBR and carbon. By virtue of a combination of the RFL treating of the covering fabric-rubber composite and the preparing of the upper rubber layer from a rubber compound whose principal components are H-NBR and carbon, the same operation and effects as the foregoing invention can be achieved. The RFL has the capability to enhance the adhesion of the covering fabric to the rubber thereby enabling the belt to exhibit improved crack resistance. Additionally, the H-NBR of the upper rubber layer enables the belt to exhibit improved heat resistance while the carbon enables the belt to exhibit both increased abrasion resistance and increased viscosity resistance.

It is preferred that each of the impregnated rubber layer, the upper rubber layer, the lower rubber layer, and the adhesive rubber layer of the covering fabric-rubber composite is composed of a rubber compound whose principal components are H-NBR and carbon, and that each of the adhesion rubber and the compression rubber is composed of a rubber compound whose principal components are rubber other than H-NBR and carbon.

Such arrangement improves the adhesion of the covering fabric-rubber composite to the adhesion rubber layer. Additionally, even when the adhesion rubber layer is composed of rubber other than H-NBR, the adhesion of the covering fabric-rubber composite to the adhesion rubber layer can be enhanced. This makes it possible to hold the amount of H-NBR to be used low, which is an advantage because the H-NBR is expensive. Additionally, each of the adhesion rubber layer and the compression rubber may be prepared using an adequate rubber composition to meet performance required. To sum up, while achieving a reduction of the production cost, optimum rubber compounds for the preparation of the adhesion rubber and the compression rubber may be employed.

The rubber other than H-NBR is preferably alkylated chlorosulfonated polyethylene (hereinafter called ACSM) having resistance to heat. This enables the adhesion rubber layer and the compression rubber to exhibit, for example, improved heat resistance and improved dynamic fatigue resistance. An improved V-ribbed belt can be provided which is most suitable for belt motion transmission including belt back-face drive in a high temperature environment while achieving a reduction of the costs.

BRIEF DESCRIPTION OF THE DRAWINGS

FIG. 3 is comprised of FIG. 3a, FIG. 3b, and FIG. 3c, wherein

DETAILED DESCRIPTION OF THE INVENTION

Figure 1:
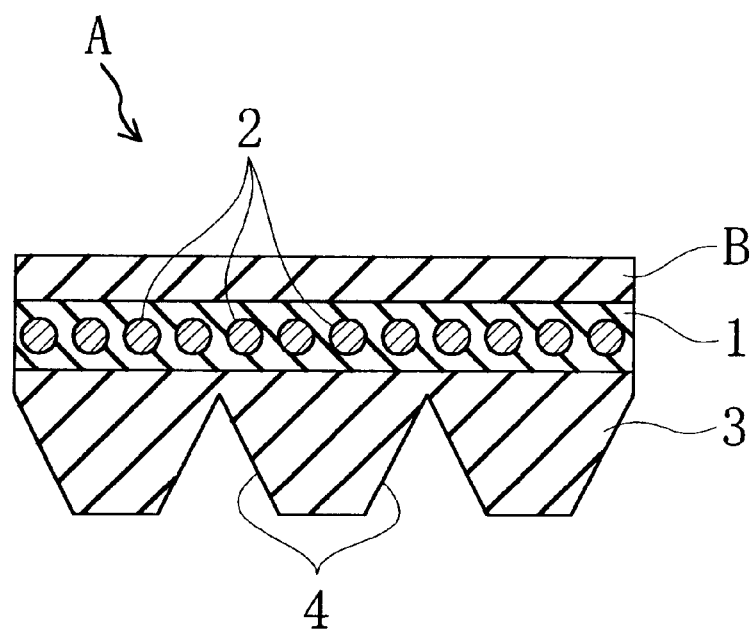
FIG. 1 is a cross-sectional view of an embodiment of a V-ribbed belt formed in accordance with the present invention.

A preferred embodiment of this invention is now described with reference to the accompanying drawing figures. FIG. 1 shows a V-ribbed belt A of the present embodiment. The belt A is made up of a compression rubber 3, an adhesion rubber 1 laminated to the upper surface of the compression rubber 3, and a plurality of tension members 2 disposed in the adhesion rubber 1 in the longitudinal direction of the belt A and fixed or held in place by rubber of the adhesion rubber 1. Two grooves 4, 4 with a cross-section of vee shape are formed continuously in the lower surface of the compression rubber 3, extending in the belt longitudinal direction. A covering fabric-rubber composite B is coated over the upper surface of the adhesion rubber 1.

Figure 2:
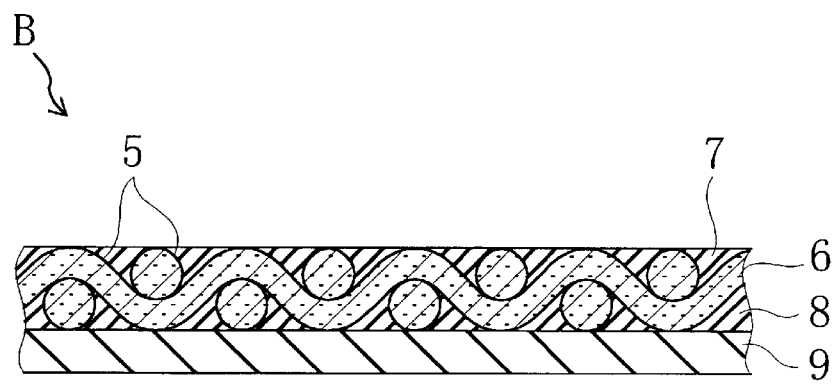
FIG. 2 is an enlarged cross-sectional view of a covering fabric-rubber composite of the present invention.

Referring now to FIG. 2, the composite B is composed of a covering fabric 5, an impregnated rubber 6 introduced into the covering fabric 5, an upper rubber layer 7 applied, as a fabric weave texture sealer, onto the upper surface of the covering fabric 5, a lower rubber layer 8, applied, as a fabric weave texture sealer, onto the lower surface of the covering fabric 5, and an adhesive rubber layer 9 applied onto the lower surface of the lower rubber layer 8 for providing adhesion of the composite B to the upper surface of the adhesion rubber 1.

The covering fabric 5 is made of tough fabric such as a cotton fabric. The covering fabric 5 may be RFL-treated in some cases. In the composite B, its rubber sections, i.e., the impregnated rubber 6, the upper rubber layer 7, the lower rubber layer 8, and the adhesive rubber layer 9, are all formed of a rubber compound exhibiting both abrasion/viscosity resistance and heat crack resistance. Such a rubber compound may be (a) a rubber compound whose principal components are H-NBR and carbon or (b) a rubber compound compounded of H-NBR and 5 to 15 phr of an adhesive prepared by mixing, together with silica, resorcinol or denatured resorcinol with a methylene donor.

Figure 3A:
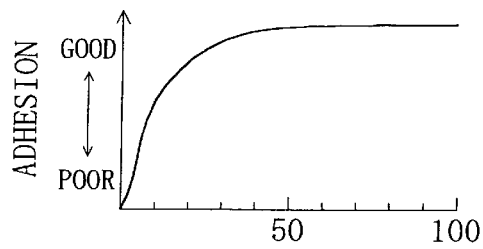
FIG. 3a shows how the adhesion changes with the compounding amount of an adhesive.
Figure 3B:
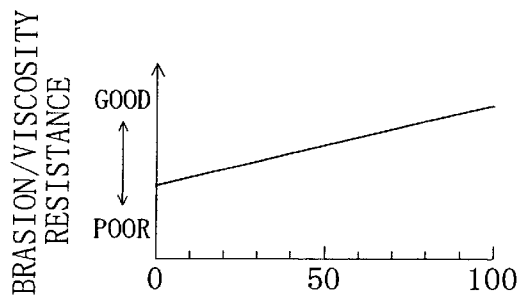
FIG. 3b shows how the abrasion/viscosity resistance changes with the adhesive compounding amount.
Figure 3C:
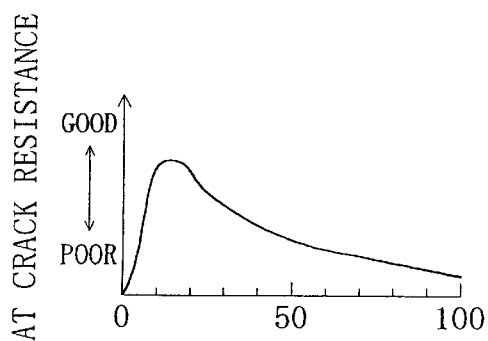
FIG. 3c shows how the heat crack resistance changes with the adhesive compounding amount wherein the adhesive is prepared by mixing resorcinol or denatured resorcinol with a methylene donor.

FIG. 3 shows that, if the compounding amount of the foregoing adhesive for H-NBR is less than 5 phr, this results in poor adhesion of the composite B to the adhesion rubber 1 as well as in insufficient improvement in abrasion/viscosity and heat crack resistance (see FIG. 3). On the other hand, if the adhesive compounding amount is more than 15 phr, scorching occurs at the time of rubber processing because the adhesive is a reactive phenolic resin therefore leading to poor processability and to a drop in heat crack resistance.

The covering fabric 5 is dipped in a rubber cement obtained by dissolving the foregoing rubber compound in an organic solvent, preferably toluene. Thereafter, the covering fabric 5 is compressed for rubber impregnation into the warp and woof of the covering fabric 5. A rubber cement, obtained by dissolving the foregoing rubber compound in an organic solvent, is spread over both the upper and lower surfaces of the covering fabric 5 to form the upper and lower rubber layers 7 and 8. Likewise, the rubber cement is spread over the lower surface of the lower rubber layer 8 to form the adhesive rubber layer 9.

Each of the adhesion rubber 1 and the compression rubber 3 is composed of a rubber compound principal components of which are ACSM and carbon, and the other components thereof are a plasticizer, magnesium oxide, and a vulcanization accelerator. The magnesium oxide functions as an acid acceptor. As a substitute for magnesium oxide, hydrotalcite may be used.

The compression rubber 3 contains therein a predetermined compounding amount of short fiber oriented in the direction of the width of the belt A, in order to secure reinforcement and abrasion resistance while maintaining a stable frictional coefficient. As short fiber, nylon fibers, aramid fibers, or cotton fibers are used independently or in a mixed fashion.

In accordance with the present embodiment, the rubber compound exhibits good processibility. Good adhesion of the composite B to the adhesion rubber 1 is obtained. There can be made improvement in belt back-face abrasion/viscosity resistance and improvement in belt back-face heat crack resistance.

Each of the adhesion rubber 1 and the compression rubber 3 is composed of the rubber compound whose principal components are ACSM and carbon. The adhesion rubber 1 and the compression rubber 3 therefore are superior in, for example, heat resistance and dynamic fatigue resistance. This achieves a decreased dose of H-NBR which is expensive, and the belt A is a belt most suitable for belt back-face drive in high-temperature environment.

In the foregoing embodiment, the adhesion rubber 1 and the compression rubber 3 is composed of a rubber compound whose principal components are ACSM and carbon. As a substitute for ACSM, H-NBR or rubber other than H-NBR may be used with the same effects.

EXAMPLES

Examples 1–4 and Comparative Examples 1–4, which are V-ribbed belts, are now discussed. In these V-ribbed belts, their adhesion rubber layers and compression rubber layers were prepared using the following rubber compounds whose principal components are ACSM and carbon, and the number of grooves with a cross-section of vee shape formed on the lower surface of each compression rubber layer is two (the number of ribs: three). As ACSM, ectos ET-8010 (tradename), a product of TOSOH CORPORATION, was used.

|  | (phr) |
|---|---|
| ACSM | 100 |
| FEF CARBON | 50 |
| PLASTICIZER | 10 |
| MAGNESIUM OXIDE | 4 |
| VULCANIZATION ACCELERATOR | 5 |

In Examples 1–3, non-RFL treated covering fabric-rubber composites were used and rubber compounds, compounded of H-NBR and different compounding amounts of an adhesive (from 5 to 15 phr) that is a mixture of a methylene acceptor (denatured resorcinol) and a methylene donor, were used. In Example 4, a RFL treated covering fabric-rubber composite was used and a rubber compound without the foregoing adhesive was used.

Like Examples 1–3, RFL treated covering fabric-rubber composites were used in Comparative Examples 1–4. In Comparative Example 1, a rubber compound, which is a compound of ACSM and a methylene acceptor-methylene donor mixture adhesive, was used. In Comparative Example 2, a rubber compound, in which H-NBR is not mixed with a methylene acceptor-methylene donor mixture adhesive, was used. In Comparative Examples 3 and 4, rubber compounds, which are compounds of different compounding amounts (out of the range of from 5 to 15 phr) of a methylene acceptor-methylene donor mixture adhesive and H-NBR, were used.

The processibility (scorching) of the aforesaid rubber compounds was examined. As a methylene donor, SUMIKANOL 507 (tradename), a product of SUMITOMO CHEMICAL, was used. As a methylene acceptor, SUMIKANOL 620 (tradename), a product of SUMITOMO CHEMICAL, was used.

V-ribbed belts were prepared by vulcanization bonding the covering fabric-rubber composites of TABLE to the upper surface of the foregoing adhesion rubber. Each of the V-ribbed belts thus prepared was examined on the adhesion of each of the covering fabric-rubber composites to the adhesion rubber, on the belt back-face abrasion/viscosity resistance, and on the belt back-face heat crack resistance.

Figure 4:
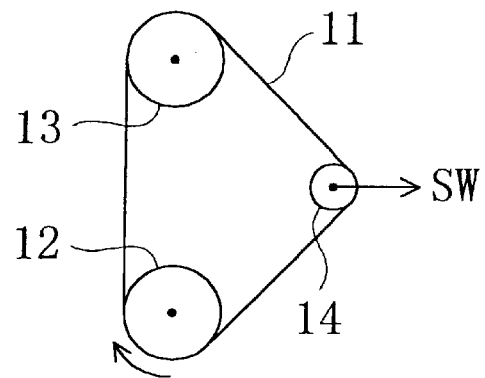
FIG. 4 outlines how belt back-face abrasion/viscosity resistance testing was carried out.

Belt back-face abrasion/viscosity testing was carried out as follows. Referring to FIG. 4, therein shown are a driving pulley 12 with a diameter of 120 mm, a driven pulley 13 with a diameter of 120 mm disposed above the driving pulley 12, and an idler 14 with a diameter of 45 mm disposed laterally to between the pulleys 12 and 13. Each of the V-ribbed belts 11 was turned inside out so that the covering fabric-rubber composite lies inside and was passed around the pulleys 12, 13, and 14. A force of 833 N, SW, was applied to the idle pulley 14 in horizontal direction, a load of 5.88 KW was applied to the driven pulley 13, and the driving pulley 12 was rotated at a speed of 4900 rpm for 30 minutes at room temperature (atomospheric temperature). The condition of the surfaces of the covering fabric-rubber composites 11 were examined for the degree of abrasion as well as for the degree of viscosity.

Figure 5:
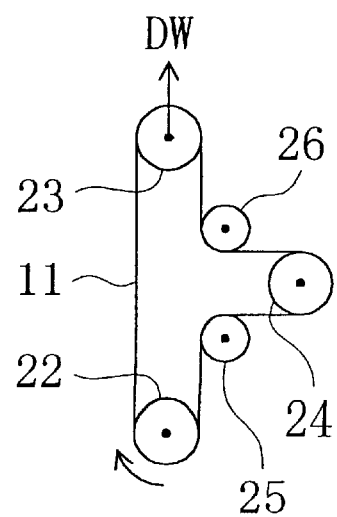
FIG. 5 outlines how belt back-face heat crack resistance testing was carried out.

Belt back portion heat crack resistance testing was run as follows. Referring to FIG. 5, therein shown are a driving pulley 22 with a diameter of 60 mm, a driven pulley 23 with a diameter of 60 mm disposed above the driving pulley 22, and an idler 24 with a diameter of 60 mm disposed laterally to between the pulleys 22 and 23. Each of the V-ribbed belts 11 was passed around the pulleys 22, 23, and 24. Disposed between the driving pulley 22 and the idler 24 is an idler 25 with a diameter of 50 mm by means of which each V-ribbed belt 11 is bent at an approximately right angle. Disposed between the driven pulley 23 and the idler 24 is an idler 26 with a diameter of 50 mm by means of which each V-ribbed belt 11 is bent at an approximately right angle. With an upward force of 588 N, DW, applied to the driven pulley 23, the driving pulley 22 was rotated at a speed of 5100 rpm until the belt rubber section cracked. The atomospheric temperature was set at 85 degrees centigrade. Time (crack life), taken for each V-ribbed belt 11 to undergo cracking, was examined.

TABLE shows the test results, in which CIRCLE means GOOD, TRIANGLE means RATHER GOOD, and X means POOR. Comparative Example 4 had suffered scorching at the time of rubber processing thereby making it impossible to prepare a covering fabric-rubber composite. For this reason, Comparative Example 4 was subjected, only to processibility testing.

TABLE

|  | EXAMPLES | | | | COMPARATIVE EXAMPLES | | | |
| --- | --- | --- | --- | --- | --- | --- | --- | --- |
|  | 1 | 2 | 3 | 4 | 1 | 2 | 3 | 4 |
| ACSM | — | — | — | — | 100 | — | — | — |
| H-NBR | 100 | 100 | 100 | 100 | — | 100 | 100 | 100 |
| FEF CARBON | 50 | 50 | 50 | 50 | 50 | 50 | 50 | 50 |
| PLASTICIZER | 12 | 12 | 12 | 12 | 12 | 12 | 12 | 12 |
| MAGNESIUM OXIDE | — | — | — | — | 4 | — | — | — |
| ZINC OXIDE | 5 | 5 | 5 | 5 | — | 5 | 5 | 5 |
| STEARIC ACID | 1 | 1 | 1 | 1 | — | 1 | 1 | 1 |
| SULFUR | 0.8 | 0.8 | 0.8 | 0.8 | — | 0.8 | 0.8 | 0.8 |
| VULCANIZATION ACCELERATOR | 3 | 3 | 3 | 3 | 5 | 3 | 3 | 3 |
| ANTIOXIDANT | 3 | 3 | 3 | 3 | — | 3 | 3 | 3 |
| METHYLENE DONOR | 5 | 3 | 7 | — | 5 | — | 1 | 10 |
| METHYLENE ACCEPTOR (DENATURED RESORCINOL) | 5 | 3 | 7 | — | 5 | — | 1 | 10 |
| SILICA | 10 | 10 | 10 | — | 10 | 10 | 10 | 10 |
| ADHESION | ○ | ○ | ○ | ○ | ○ | x | x | — |
| BACK ABRASION/VISCOSITY RESISTANCE | ○ | ○ | ○ | ○ | x | x | x | — |
| PROCESSIBILITY (SCORCHING) | ○ | ○ | Δ | ○ | ○ | ○ | ○ | x |
| BACK HEAT CRACK RESISTANCE | ○ | ○ | Δ | ○ | ○ | x | Δ | — |
| CRACK LIFE (h) | 500 | 400 | 250 | 480 | 450 | 150 | 250 | — |

NOTE:
Example 4 used a RFL-treated covering fabric.
The other Examples used a non-RFL-treated covering fabric.

TABLE shows that the V-ribbed belts with the covering fabric-rubber composites of Examples 1 and 2 are good. Example 3, although it contains a relatively great compound amount of a methylene acceptor-methylene donor mixture adhesive, is acceptable. Example 3 is rather inferior to Examples 1 and 2 in processibility and in belt back-face heat crack resistance. Comparative Example 4, which contains an excessive compound amount of a methylene acceptor-methylene donor mixture adhesive, is considerably poor in processibility.

On the other hand, Comparative Examples 2 and 3, the former containing therein no methylene acceptor-methylene donor mixture adhesive, and the latter containing only a small compound amount of a methylene acceptor-methylene donor mixture adhesive, are good in processibility, but these two examples are poor in adhesion, in belt back-face abrasion/viscosity resistance, and in belt back-face heat crack resistance. This shows that addition of such a mixture adhesive contributes to providing improvements in adhesion, in belt back-face abrasion/viscosity resistance, and in belt back-face heat crack resistance.

Example 4, which is a combination of a RFL treated covering fabric-rubber composite and a rubber compound whose principal components are H-NBR and carbon, achieves the same level characteristics as Examples 1 and 2. This shows that such a combination is effective.

Comparative Example 1, which is a compound of ACSM and an adhesive prepared by mixing a methylene acceptor and a methylene donor, is poor in belt back-face abrasion/viscosity resistance. This shows that a compound of H-NBR and an adhesive prepared by mixing a methylene acceptor and a methylene donor provides good belt back-face abrasion/viscosity resistance.

The invention claimed is:

1. A V-ribbed belt comprising (a) a compression rubber, (b) an adhesion rubber laminated to the upper surface of said compression rubber, and (c) a tension member fixed by rubber of said adhesion rubber to be held in place in said adhesion rubber and arranged in the direction of the length of said V-ribbed belt wherein a plurality of grooves with a cross-section of vee shape are formed in the lower surface of said compression rubber, continuously extending in the direction of the length of said V-ribbed belt and wherein the upper surface of said adhesion rubber is covered with a covering fabric-rubber composite;

said covering fabric-rubber composite including:
  a covering fabric;
  an impregnated rubber introduced into said covering fabric;
  an impregnated rubber introduced into said cover fabric;
  an upper rubber layer applied onto the upper surface of said covering fabric;
  a lower rubber layer applied onto the lower surface of said covering fabric; and
  an adhesive rubber layer applied onto the lower surface of said lower rubber layer and providing adhesion of said covering fabric-rubber composite to the upper surface of said adhesion rubber;
  wherein at least said upper rubber layer of said rubber sections of said covering fabric-rubber composite is composed of a rubber compound that has resistance to abrasion/viscosity and resistance to heat cracking, and wherein
  said rubber compound is a compound formed by incorporating 5 to 15 phr of an adhesive prepared by mixing resorcinol or denatured resorcinol with a methylene donor, into H-NBR (hydrogenated acrylonitrile-butadiene rubber).

2. The V-ribbed belt according to claim 1, wherein each of said impregnated rubber layer, said upper rubber layer, said lower rubber layer, and said adhesive rubber layer of said covering fabric-rubber composite is composed of a rubber compound formed by incorporating 5 to 15 phr of an adhesive prepared by mixing resorcinol or denatured resorcinol with a methylene donor, into H-NBR and wherein each of said adhesion rubber and said compression rubber is composed of a rubber compound whose principal components are rubber other than H-NBR and carbon.

3. The V-ribbed belt according to either claim 1 or claim 2, wherein said rubber other than H-NBR is alkylated chlorosulfonated polyethylene (ACSM).

4. A V-ribbed belt comprising (a) a compression rubber, (b) an adhesion rubber laminated to the upper surface of said compression rubber, and (c) a tension member fixed by rubber of said adhesion rubber to be held in place in said adhesion rubber and arranged in the direction of the length of said V-ribbed belt wherein a plurality of grooves with a cross-section of vee shape are formed in the lower surface of said compression rubber, continuously extending in the direction of the length of said V-ribbed belt and wherein the upper surface of said adhesion rubber is covered with a covering fabric-rubber composite;

said covering fabric-rubber composite including:
  a covering fabric impregnated with resorcinol-formalin latex;
  an impregnated rubber introduced into said covering fabric;
  an upper rubber layer applied onto the upper surface of said covering fabric;
  a lower rubber layer applied onto the lower surface of said covering fabric; and
  an adhesive rubber applied onto the lower surface of said lower rubber layer and providing adhesion of said covering fabric-rubber composite to the upper surface of said adhesion rubber;
  wherein at least said upper rubber layer of said rubber sections of said covering fabric-rubber composite is formed of a rubber compound whose principal components are H-NBR and carbon.

5. The V-ribbed belt according to claim 4, wherein each of said impregnated rubber layer, said upper rubber layer, said lower rubber layer, and said adhesive rubber layer of said covering fabric-rubber composite is composed of a rubber compound whose principal components are H-NBR and carbon and wherein each of said adhesion rubber and said compression rubber is composed of a rubber compound whose principal components are rubber other than H-NBR and carbon.

* * * * *